W. F. CHELLBERG.
PORTABLE BORING BAR.
APPLICATION FILED NOV. 2, 1918.
1,391,045.
Patented Sept. 20, 1921.
2 SHEETS—SHEET 1.
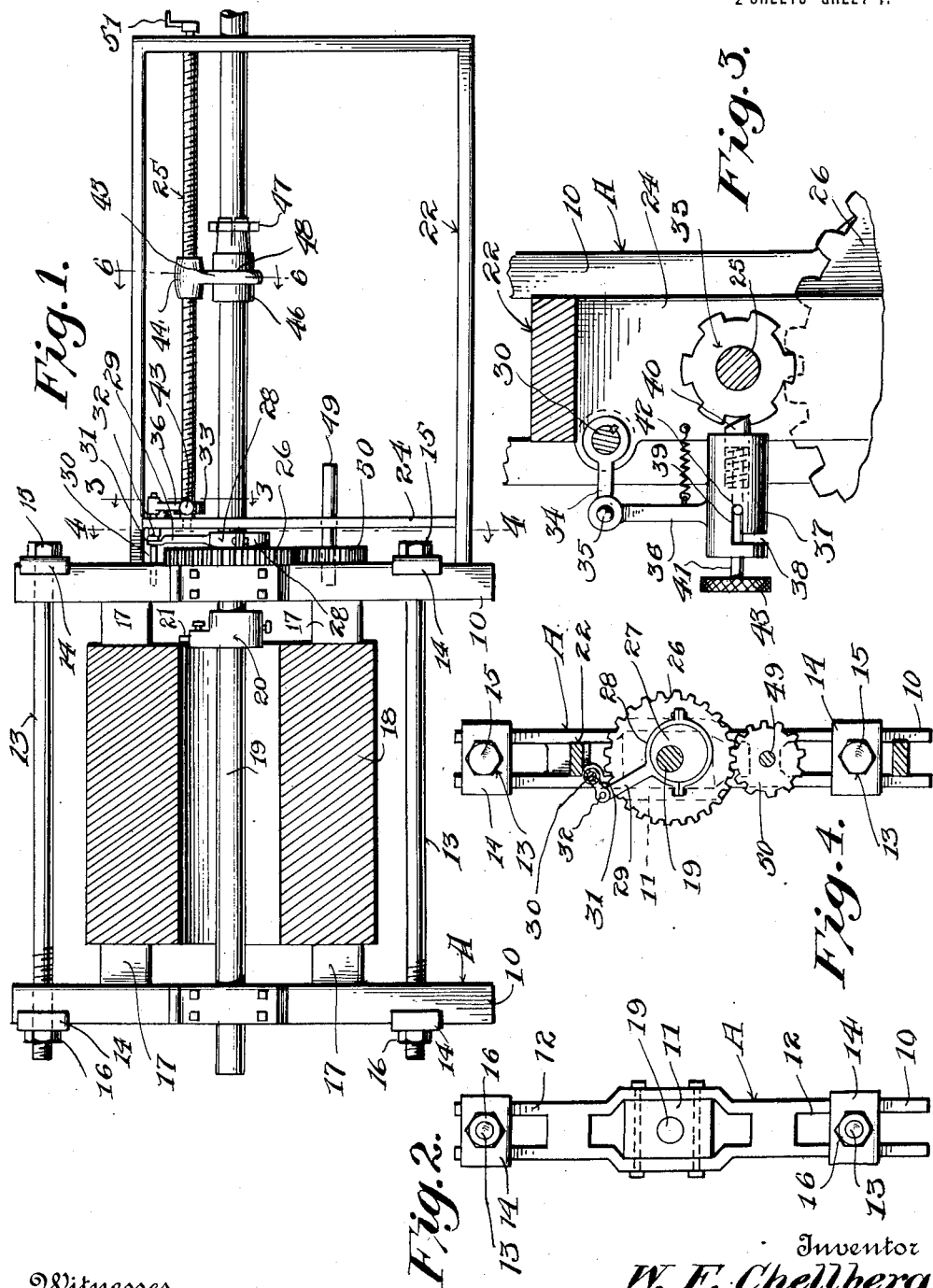
Witnesses
Inventor
W. F. Chellberg
By Chandler & Chandler
Attorneys

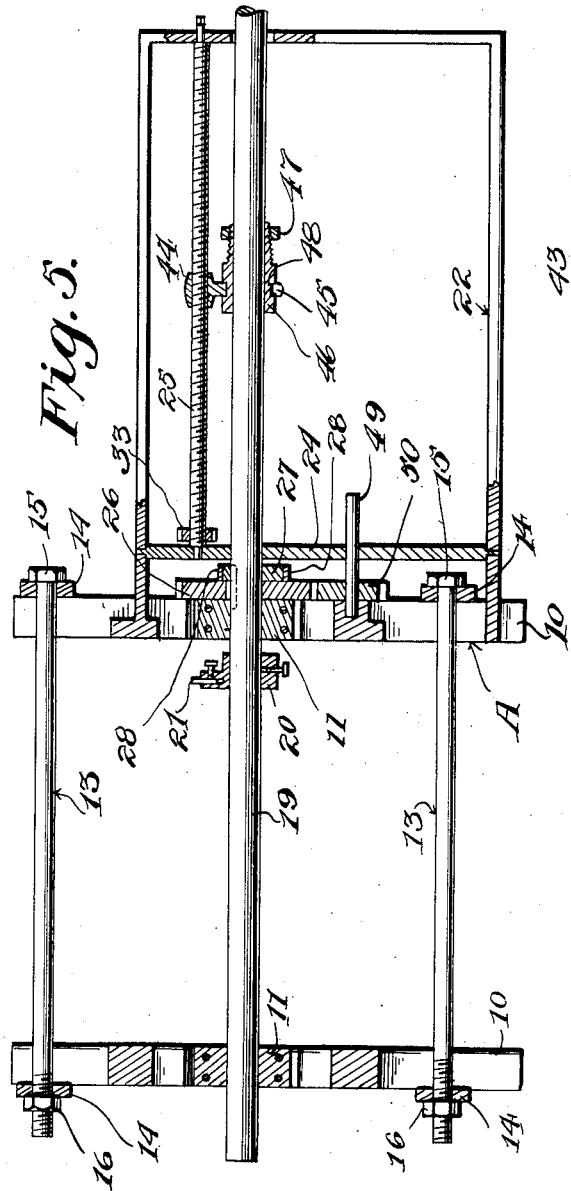
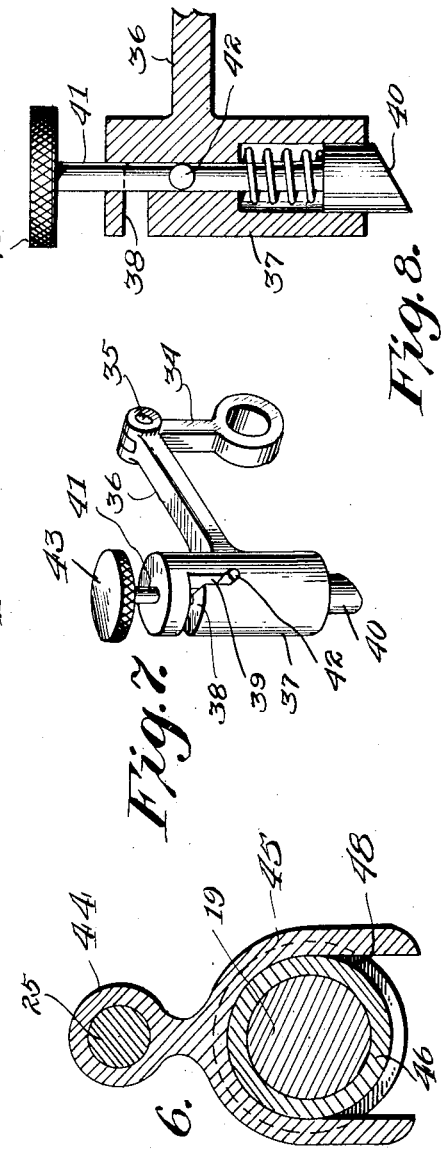

UNITED STATES PATENT OFFICE.

WALTER F. CHELLBERG, OF CHICAGO, ILLINOIS.

PORTABLE BORING-BAR.

1,391,045.  Specification of Letters Patent.  Patented Sept. 20, 1921.

Application filed November 2, 1918. Serial No. 260,803.

*To all whom it may concern:*

Be it known that I, WALTER F. CHELLBERG, a citizen of the United States, residing at Chicago, in the county of Cook, State of Illinois, have invented certain new and useful Improvements in Portable Boring-Bars; and I do hereby declare the following to be a full, clear, and exact description of the invention, such as will enable others skilled in the art to which it appertains to make and use the same.

The invention relates to a boring device and more particularly to the class of portable boring bars or machines.

The primary object of the invention is, the provision of a device of this character, wherein the boring bar is automatically operated through the medium of feed mechanism which can be manually adjusted to permit the reverse action of the boring bar or tool of the device, the feed mechanism being actuated from applied power and the device as a whole is readily portable, the parts being compact and arranged so that the work to be operated upon can be readily placed within the device and removed therefrom when the occasion requires.

Another object of the invention is, the provision of a device of this character wherein the work frame has arranged therein rests for the piece of work so that the same can be held within for the adjustment of the tool bit in the holder upon the boring bar, the latter being operated through the medium of feed mechanism which is novel in form and in its operation.

A further object of the invention is, the provision of a device of this character which is comparatively simple in construction, thoroughly reliable and efficient in its operation, strong, durable and inexpensive to manufacture.

With these and other objects in view, the invention consists in the features of construction, combination and arrangement of parts as will be hereinafter fully described, illustrated in the accompanying drawings and pointed out in the claims hereunto appended.

In the accompanying drawings:

Figure 1, is a side elevation of the device constructed in accordance with the invention showing a piece of work in vertical section clamped therein.

Fig. 2, is an end elevation.

Fig. 3, is a sectional view on the line 3—3 of Fig. 1.

Fig. 4, is a sectional view on the line 4—4 of Fig. 1.

Fig. 5, is a vertical longitudinal sectional view through the device.

Fig. 6, is a sectional view on the line 6—6 of Fig. 1.

Fig. 7, is a detailed perspective view of the ratchet arm of the feed mechanism.

Fig. 8, is a transverse sectional view therethrough.

Similar reference characters indicate corresponding parts throughout the several views in the drawings.

Referring to the drawings in detail, A, designates generally the work holding frame of the device which comprises a pair of spaced parallel end members 10 each provided with an intermediate bearing 11 which is bolted or otherwise fastened therein, while at opposite sides thereof are furcated or forked arms 12 for accommodating tie or clamp bolts 13 on which are carried clamping blocks 14 which play against the outer sides of the furcated arms 12 of the end members 10 and against which engage the heads 15 of the bolts and the nuts 16 threaded thereon. In this manner the end members 10 may be drawn toward each other to produce the clamping of a piece of work therebetween. Arranged in the furcated or forked arms 12 at the inner sides of the members 10, are work rests in the form of blocks 17 to engage the ends of a piece of work 18 to be bored, for the securing or clamping thereof in position in the frame A, as is clearly shown in Fig. 1, of the drawings.

Slidably and rotatably mounted in the bearings 11 is a boring bar or shaft 19, and upon this bar or shaft between the end members 10 of the frame A, is adjustably secured a tool holder 20 which carries a tool 21, which is adjustably mounted in the tool holder, the tool being designed to act upon the piece of work 18 for the boring of the same when the bar or shaft 19 is rotated and moved longitudinally.

Mounted on one of the end members 10 or integral therewith is a yoke or frame 22, the outer closed end of which has provided therein a suitable opening in the path of movement of the boring bar or shaft 19 to provide a clearance therefor on longitudinal movement of the same. In the yoke or frame 22 adjacent to the end member 10 carrying the same is a cross piece 24 and journaled in the latter and the closed end of said yoke or frame 22 parallel with and above the boring bar or shaft 19, is a feed screw 25, controlled and operated by feed mechanism, hereinafter fully described.

Loosely splined or keyed to the boring bar or shaft 19 is a power gear 26, which is located between the cross piece 24 and the adjacent end member 10 of the frame A and has formed thereon a cam or eccentric 27 embraced by eccentric straps 28, of the usual two-part construction having one part formed with an eccentric arm 29 for connection with the feed mechanism hereinafter fully described.

Journaled in the crosspiece 24 in the frame 22 above the driven gear 26, is a rock shaft 30 of the feed mechanism and this shaft at one end is formed with a crank arm 31 which at its extremity is pivoted at 32 at the end of the eccentric arm 29 so that when the cam rotates the rock shaft 30 will be actuated. Fixed to the feed screw 25 is a ratchet cog wheel 33, while fixed to the rocking shaft 30 is a crank 34 to the end of which is pivoted at 35, an arm 36 carrying a barrel or head 37, in which is slidably mounted a reversible ratchet dog 40 for engagement with and disengagement from the ratchet cog wheel 33. Said head 37 in said wall thereof is formed with a longitudinal slot 39 having lateral end notches 38 and fixed in the stem 41 of the dog 40 is a lug 42 which operates in the slot and the notches thereof so that the dog 40 can be released from engagement with the ratchet wheel 33, or said dog can be reversed within the head 37 to reverse the feeding action of the feed mechanism imparting motion from the gear 26 to the feed screw 25, the stem 41 of the dog 40 being formed with a finger piece 43 for the manual setting of the dog.

Threaded on the feed screw 25 is a feed nut 44 carrying a fork 45 which loosely engages an annular groove 48 in a collar 46 adjustably secured to the boring bar or shaft 19, through the medium of a locking nut 47 screwed onto the conical split end of said collar, so that in the movement of the nut 44 by the feed screw 25, the boring bar or shaft 19 will receive advance or retrograde movement through the frames A and 22.

Journaled in the cross piece 33 in the frame 22 and the adjacent end member 10 of the frame A, is a driving shaft 49 on which is fixed a pinion 50 meshing with the power gear 26 and this driving shaft 49 is operated from an air, electric or other motor not shown, for the operation of the device.

It will be clearly apparent that the feed mechanism can be set for reverse action the controlling rotation and advance of the retrograde boring bar or shaft 19. The outer end of the feed screw 25 has detachably fitted thereon a manually operable handle 51 for use, when the occasion requires. It will be readily apparent that the work 18 can be properly clamped and secured within the work-holding frame A for the boring thereof in the device, which is operated from the feed mechanism driven from a motor or other applied mechanical or electrical power.

It is to be understood that changes, variations and modifications may be made in the invention such as come properly within the scope of the appended claims without departing from the spirit of the invention or sacrificing any of its advantages.

What is claimed is:

1. In a machine of the type described, the combination with a power wheel, a main shaft therethrough and carrying a tool, a feed screw, and connections between the screw and shaft for advancing the tool with respect to the work; of a ratchet gear fast on the screw, a rock shaft, means for oscillating it by the rotation of said wheel, a crank on said shaft, a head connected therewith and having an axial bore and a longitudinal slot intersecting the bore and provided with lateral notches, a dog reversibly mounted within said bore and having a beveled tip, and a lug on the dog engaging said slot and notches, as described.

2. In a machine of the type described, the combination with a power wheel, a main shaft splined therethrough and having a tool, a collar adjustable on said shaft and having an annular groove, and a nut for locking the collar after its adjustment; of a feed screw along the shaft, means for turning it, and a nut threaded on the screw and having a fork engaging said groove.

3. In a machine of the type described, the combination with a frame, a power wheel journaled therein, a main shaft mounted in the frame and wheel for rotation with the latter and longitudinal adjustment, a tool carried by said shaft, a screw mounted in fixed bearings in the frame and standing parallel with the shaft, and operative connections between said wheel and screw; of a collar loosely surrounding the shaft and having one end split and tapered and externally threaded, a nut on this end for clamping it to the shaft and holding the collar in adjusted position thereon, and an element swiveled on said collar and threaded for engagement with said screw.

In testimony whereof, I affix my signature, in the presence of two witnesses.

WALTER F. CHELLBERG.

Witnesses:
CHARLES W. JENSEN,
JERRY H. MARQUART.